(12) United States Patent
Gibson et al.

(10) Patent No.: US 9,624,667 B2
(45) Date of Patent: Apr. 18, 2017

(54) HOLLOW, COMPOSITE REBAR STRUCTURE, ASSOCIATED FABRICATION METHODOLOGY, AND APPARATUS

(71) Applicant: Composite Rebar Technologies, Inc., Portland, OR (US)

(72) Inventors: Robert C. Gibson, Chicago, IL (US); Thomas S. Ohnstad, Salem, OR (US); Thomas A. Hershberger, Madison, WI (US); Gregory A. Zjaba, Verona, WI (US); Richard A. Schulte, Madison, WI (US); Sean Walsh, Carrboro, NC (US)

(73) Assignee: Composite Rebar Technologies, Inc., Portland, OR (US)

( * ) Notice: Subject to any disclaimer, the term of this patent is extended or adjusted under 35 U.S.C. 154(b) by 0 days.

(21) Appl. No.: 14/857,722

(22) Filed: Sep. 17, 2015

(65) Prior Publication Data

US 2016/0076249 A1    Mar. 17, 2016

Related U.S. Application Data

(60) Provisional application No. 62/051,715, filed on Sep. 17, 2014.

(51) Int. Cl.
*E04C 3/00*    (2006.01)
*E04C 5/07*    (2006.01)
(Continued)

(52) U.S. Cl.
CPC ............ *E04C 5/07* (2013.01); *B29C 47/0023* (2013.01); *B29C 47/021* (2013.01);
(Continued)

(58) Field of Classification Search
CPC ....... E04C 5/07; B29C 47/07; B29C 47/0023; B29C 47/06; B29C 47/021; B29C 47/003;
(Continued)

(56) References Cited

U.S. PATENT DOCUMENTS 3,283,050 A    11/1966   Boggs
3,561,493 A *   2/1971   Maillard ................. F16L 9/121
                                                                               138/137

(Continued)

FOREIGN PATENT DOCUMENTS

CA        2586394 A1   10/2008
DE        2500375 A1   7/1976
WO      9513414 A1   5/1995

OTHER PUBLICATIONS

"FRP Fire Resistance", circa before Sep. 24, 2011, 1 page.
(Continued)

*Primary Examiner* — Brian Mattei
(74) *Attorney, Agent, or Firm* — Kolisch Hartwell, P.C.

(57) ABSTRACT

A rebar structure for concrete reinforcement may include an elongate tubular central wall portion having an inside surface and an outside surface. The central wall portion may be formed circumferentially around a core axis and may include glass or carbon fibers mostly being oriented longitudinally parallel to the core axis. The rebar structure may include an inner wall portion bonded to the inside surface of the central wall portion. The inner wall portion may include glass or carbon fibers and may have a higher percentage of fibers oriented non-parallel to the core axis as compared to the central wall portion.

20 Claims, 5 Drawing Sheets

(51) Int. Cl.
*B29C 47/00* (2006.01)
*B29C 70/52* (2006.01)
*B29C 47/02* (2006.01)
*B29C 47/06* (2006.01)
*B29K 307/04* (2006.01)
*B29K 309/08* (2006.01)
*B29K 101/10* (2006.01)

(52) U.S. Cl.
CPC ............ *B29C 47/065* (2013.01); *B29C 70/52* (2013.01); *B29C 70/521* (2013.01); *B29K 2101/10* (2013.01); *B29K 2307/04* (2013.01); *B29K 2309/08* (2013.01)

(58) Field of Classification Search
CPC ............ B29K 2307/04; B29K 2309/00; B29K 2309/08
See application file for complete search history.

(56) References Cited

U.S. PATENT DOCUMENTS

| | | | |
|---|---|---|---|
| 4,110,120 A | 8/1978 | Rosenberg et al. | |
| 4,265,981 A | 5/1981 | Campbell | |
| 4,296,060 A | 10/1981 | Killmeyer et al. | |
| 4,780,166 A | 10/1988 | Hunter | |
| 4,814,133 A | 3/1989 | Matsuno et al. | |
| 5,055,324 A | 10/1991 | Stecker | |
| 5,084,221 A | 1/1992 | Matsuno et al. | |
| 5,166,230 A | 11/1992 | Stecker | |
| 5,182,064 A | 1/1993 | Ishizuka et al. | |
| 5,218,810 A * | 6/1993 | Isley, Jr. | E04C 3/34 52/249 |
| 5,567,374 A | 10/1996 | Thicthener et al. | |
| 5,593,536 A | 1/1997 | Kaiser | |
| 5,593,744 A | 1/1997 | Van Vechten et al. | |
| 5,609,806 A | 3/1997 | Walsh et al. | |
| 5,626,700 A | 5/1997 | Kaiser | |
| 5,650,109 A | 7/1997 | Kaiser et al. | |
| 5,650,224 A | 7/1997 | March et al. | |
| 5,702,816 A | 12/1997 | Kaiser | |
| 5,727,357 A * | 3/1998 | Arumugasaamy | D07B 1/025 428/377 |
| 5,729,952 A | 3/1998 | Dahl | |
| 5,763,042 A | 6/1998 | Kaiser et al. | |
| 5,851,468 A | 12/1998 | Kaiser | |
| 5,876,553 A | 3/1999 | Kaiser | |
| 5,888,601 A | 3/1999 | Quigley et al. | |
| 5,904,886 A | 5/1999 | Stecker | |
| 5,950,393 A | 9/1999 | Stecker | |
| 5,966,895 A | 10/1999 | Stecker | |
| 6,023,903 A | 2/2000 | Stecker | |
| 6,092,960 A | 7/2000 | McCallion | |
| 6,171,016 B1 | 1/2001 | Pauls et al. | |
| 6,197,395 B1 | 3/2001 | Van Vechten et al. | |
| 6,221,295 B1 | 4/2001 | Kaiser et al. | |
| 6,316,074 B1 | 11/2001 | Kaiser et al. | |
| 6,403,004 B1 | 6/2002 | Stecker | |
| 6,485,660 B1 | 11/2002 | Kaiser et al. | |
| 6,493,914 B2 | 12/2002 | Kaiser et al. | |
| 6,517,277 B2 | 2/2003 | Hu et al. | |
| 7,632,037 B2 | 12/2009 | Brinkman | |
| 8,206,059 B1 | 6/2012 | Southgate et al. | |
| 8,413,396 B2 | 4/2013 | Oliva et al. | |
| 9,149,993 B2 | 10/2015 | Gibson et al. | |
| 9,156,210 B2 | 10/2015 | Gibson et al. | |
| 9,162,399 B2 | 10/2015 | Gibson et al. | |
| 2005/0123374 A1 | 6/2005 | Thorning | |
| 2007/0006961 A1 * | 1/2007 | Kusek | B29C 53/8066 156/169 |
| 2007/0298236 A1 * | 12/2007 | Simmons | B32B 5/16 428/299.1 |
| 2008/0127599 A1 * | 6/2008 | Chen | E04C 5/07 52/854 |
| 2008/0248302 A1 * | 10/2008 | Lee | E04C 5/07 428/378 |
| 2008/0261042 A1 | 10/2008 | Brandstrom | |
| 2009/0017244 A1 * | 1/2009 | Martino | B29C 47/021 428/35.7 |
| 2010/0031607 A1 | 2/2010 | Oliva et al. | |
| 2010/0143692 A1 | 6/2010 | Ryan | |
| 2012/0066994 A1 | 3/2012 | Gibson et al. | |
| 2012/0076969 A1 * | 3/2012 | Ponomarev | C04B 28/02 428/70 |
| 2013/0316104 A1 * | 11/2013 | Adam | B28B 13/021 428/34.5 |

OTHER PUBLICATIONS

"Composite Rebar Manufacturers", circa before Sep. 24, 2011, 1 page.
"TUF-BAR TM Fibreglass Rebar", Composites Ltd., Sep. 2006, 2 pages.
"Pultrall V ROD", circa before Sep. 24, 2011, 1 page.
"The Solution for Corrosion", V ROD Composite Rebar for Concrete Structures, circa before Sep. 24, 2011, 6 pages.
"Fiberglass Rebar", Asian FRP Hughes Brothers, circa before Sep. 24, 2011, 4 pages.
"Glass Fiber Reinforced Polymer (GFRP) Rebar" Asian 100 by Hughes Brothers, May 2007, 12 pages.
"RockBar Corrosion resistant basalt fibre reinforcing bars", MagmaTech, circa before Sep. 24, 2011, 2 pages.
"Fibreglass (GFRP) Rebar Infrastructure Applications", Composites Ltd., circa before Sep. 24, 2011, 34 pages.
"FiReP GRP Bolts Bolting Systems for Mining and Tunneling", Minova, circa before Sep. 24, 2011, 12 pages.
"FiReP(R) Product Brochure", Minova, Mar. 2010, 20 pages.
"Technical Information Schock Combar(R)", Schock Bauteile GmbH, Mar. 2006, 23 pages.
"C-BAR Product Guide Specification", Marshall Composite Systems, LLC, Jan. 1999, 10 pages.
"Specification for Carbon and Glass Fiber-Reinforced Polymer Bar Materials for Concrete Reinforcement, an ACI Standard", American Concrete Institute, Jul. 2008, 10 pages.
"TBM Launch & Reception Soft Eye Openings", Asian FRP, 2007, 12 pages.
"Carbon Fiber Reinforced Polymer (CFRP)", Asian 200 by Hughes Brothers, 2009, 7 pages.
"FRPDistributors.com Home Page"., circa before Sep. 24, 2011, 3 pages.
"GFRP Rebar Specifications", Sep. 2006, 6 pages.
"GFRP vs. Steel", circa before Sep. 24, 2011, 27 pages.
"Hughes Brothers Website Notes", circa before Sep. 24, 2011, 13 pages.
"Fibre reinforced composite", Schock ComBAR, circa before Sep. 24, 2011, 2 pages.
"Products Features Unique to TUF-BAR TM fibreglass rebar", circa before Sep. 24, 2011, 8 pages.
U.S. Patent and Trademark Office, Office action regarding U.S. Appl. No. 13/215,199, Aug. 13, 2014, 29 pages.
U.S. Patent and Trademark Office, Office action regarding U.S. Appl. No. 14/447,496, Feb. 13, 2015, 21 pages.
U.S. Patent and Trademark Office, Office action regarding U.S. Appl. No. 14/447,513, Feb. 13, 2015, 15 pages.
U.S. Receiving Office, International Search Report of the International Searching Authority regarding PCT/US15/50816, Jan. 29, 2016, 4 pages.
U.S. Receiving Office, Written Opinion of the International Searching Authority regarding PCT/US15/50816, Jan. 29, 2016, 4 pages.

* cited by examiner

HOLLOW, COMPOSITE REBAR STRUCTURE, ASSOCIATED FABRICATION METHODOLOGY, AND APPARATUS

CROSS-REFERENCE TO PRIORITY APPLICATION

This application claims filing-date priority to U.S. Provisional Patent Application Ser. No. 62/051,715, filed Sep. 17, 2014, for "Hollow Composite Rebar Structure with Enhanced Hoop Strength and Pull-out Resistance, and Associated Fabrication Methodology and Apparatus", the entire disclosure content in which is hereby incorporated herein by reference.

BACKGROUND

This invention pertains to hollow, composite-material, rebar structure, to methodology for making this structure, and to apparatus which implement the making methodology.

Rebar is commonly used to reinforce concrete structures such as roads, bridges, tunnels, airport runways, levies, and parking decks among others. In such structures, the rebar is embedded within the concrete and the external surface of the rebar is often ribbed in order to mechanically bind it to the concrete. The concrete provides compression strength (roughly speaking, resistance to compression) and the rebar provide tensile strength (resistance to pulling). Concrete is the most widely-used, man-made, construction material today.

Rebar products made out of composites of fibers and resin provide several advantages over those made out of steel. First and foremost, composite-material rebar does not experience the corrosion and degradation that steel does in some concrete environments. As the steel rebar corrodes it loses strength, thereby becoming less effective at carrying tensile loads. Further, as the rebar corrodes it expands substantially and "blows apart" the surrounding concrete mass, thereby rendering the concrete less effective at carrying compressive loads.

Such failing structures cannot be repaired from the inside and often have to be replaced entirely. This replacement is often costly, both financially as well as environmentally. The financial cost is apparent. The environmental cost becomes clear when one considers the environmental impact of manufacturing and transporting the replacement concrete and cement, which cannot be recycled. Therefore, while composite-material rebar may be nominally more expensive than steel rebar, using composite-material rebar will ultimately result in a less expensive overall structure due to the extended lifespan of the reinforced concrete that will not need to be replaced.

Composite-material rebar products that have a hollow center along their long axis confer several advantages over solid composite-material rebar products. The tensile strength of solid composite rebar does not increase linearly with the diameter of the rebar. Therefore, to increase the tensile strength considerably the rebar must be made thicker than one would otherwise expect. Increasing the diameter of the rebar increases the material cost of the product and may make the rebar more susceptible to failure due to load-carrying effects that differ between the fibers at the center and those at the edge of the rebar.

In contrast, hollow composite-material rebar will not increase in cost as much with an increase in diameter as a hollow product will be composed of much less material than a solid product. Further, by making the rebar hollow and omitting the fibers at the center of the rebar, there will be less discrepancy in load between the fibers of the rebar.

Another benefit to hollow composite-material rebar is the strength of the rebar can be adjusted by varying the thickness of the wall of the rebar without changing the outer diameter of the rebar. In contrast, increasing the strength of solid rebar by increasing the outer diameter of the rebar will result in correspondingly less concrete in a similarly sized structure, and therefore, less compression strength. Thus, the tensile strength of the hollow rebar may be adjusted without an effect on the compression strength of the surrounding concrete.

Finally, hollow rebar can provide a conduit or passageway through a reinforced concrete structure not available if solid rebar is used. Such a passageway could be used for the flow of different fluids, electrical cables, fiber optic cables, as well as for accommodating the internal employment of information yielding sensors, among others.

A natural question to ask when considering hollow rebar is, "Will it collapse?" It is possible that compressive radial forces may cause a hollow rebar element to collapse. Further, forces that pull on the ends of a hollow rebar element may cause the rebar to collapse radially, much as a Chinese finger puzzle. If a rebar element were to collapse radially, the external surface of the rebar would necessarily pull away from the corresponding internal surface of the concrete to which the rebar was bonded. This may cause a dramatic failure where the rebar is pulled out of the concrete structure.

The present disclosure provides a hollow composite-material rebar structure than may have enhanced radial strength and resistance to pull-out. The present disclosure further provides for an apparatus capable of producing such a hollow composite-material rebar structure and a method of using said apparatus.

SUMMARY

A rebar structure for concrete reinforcement may include an elongate tubular central wall portion having an inside surface and an outside surface. The central wall portion may be formed circumferentially around a core axis and may include glass or carbon fibers mostly being oriented longitudinally parallel to the core axis. The rebar structure may include an inner wall portion bonded to the inside surface of the central wall portion. The inner wall portion may include glass or carbon fibers and may have a higher percentage of fibers oriented non-parallel to the core axis as compared to the central wall portion.

A method of making rebar may include forming an uncured inner layer of a hollow tubular rebar structure around a mandrel and a core axis. The inner layer may be formed along a processing path and upstream from a pultrusion die. The inner layer may include resin and glass or carbon fibers. The method may include forming an uncured central layer of the hollow tubular rebar structure around the uncured inner layer and upstream from the pultrusion die. The central layer may include resin and glass or carbon fibers oriented mostly parallel to the core axis. The inner layer having a higher percentage of fibers oriented non-parallel to the core axis as compared to the central layer.

An apparatus for making an elongate, composite-material rebar structure may include an elongate mandrel. The apparatus may have a rebar-formation axis and upstream and downstream regions disposed at spaced locations along said axis. The mandrel may have a long axis which is substantially coincident with said rebar-formation axis and may extend from said upstream region toward said downstream region. The apparatus may include an inner guide configured to form an uncured inner layer around the mandrel of resin and glass or carbon fibers. The apparatus may include a central guide downstream of the inner guide configured to form an uncured central layer, around the uncured inner layer, of resin and glass or carbon fibers. The central layer may have fibers oriented mostly parallel to the rebar-formation axis and the inner layer may have a higher percentage of fibers oriented non-parallel to the core axis as compared to the central layer. The apparatus may include a pultrusion die having a long axis which is substantially coincident with the rebar-formation axis, circumsurrounding the mandrel. The pultrusion die may be configured to form an elongate, composite, hollow rebar structure including the inner layer and the central layer and may be disposed downstream of the inner guide and the central guide.

The present disclosure provides various structures, manufacturing apparatuses and methods of use thereof. In some embodiments, a hollow rebar structure may include an inner layer of multi-directional fibers and a central layer of uni-directional fibers. In some embodiments, an apparatus may be configured to make such a hollow rebar structure, including an external purchase-enhancing structure. In some embodiments, the hollow rebar structure may include a reinforcing core structure.

Features, functions, and advantages may be achieved independently in various embodiments of the present disclosure, or may be combined in yet other embodiments, further details of which can be seen with reference to the following description and drawings.

DESCRIPTION

Overview

Various embodiments of a hollow composite-material rebar structure having a plurality of fiber-reinforces layers are described below and illustrated in the associated drawings. Unless otherwise specified, the rebar structure and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other composite-material structural components. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary hollow, composite-material rebar structures as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 1:
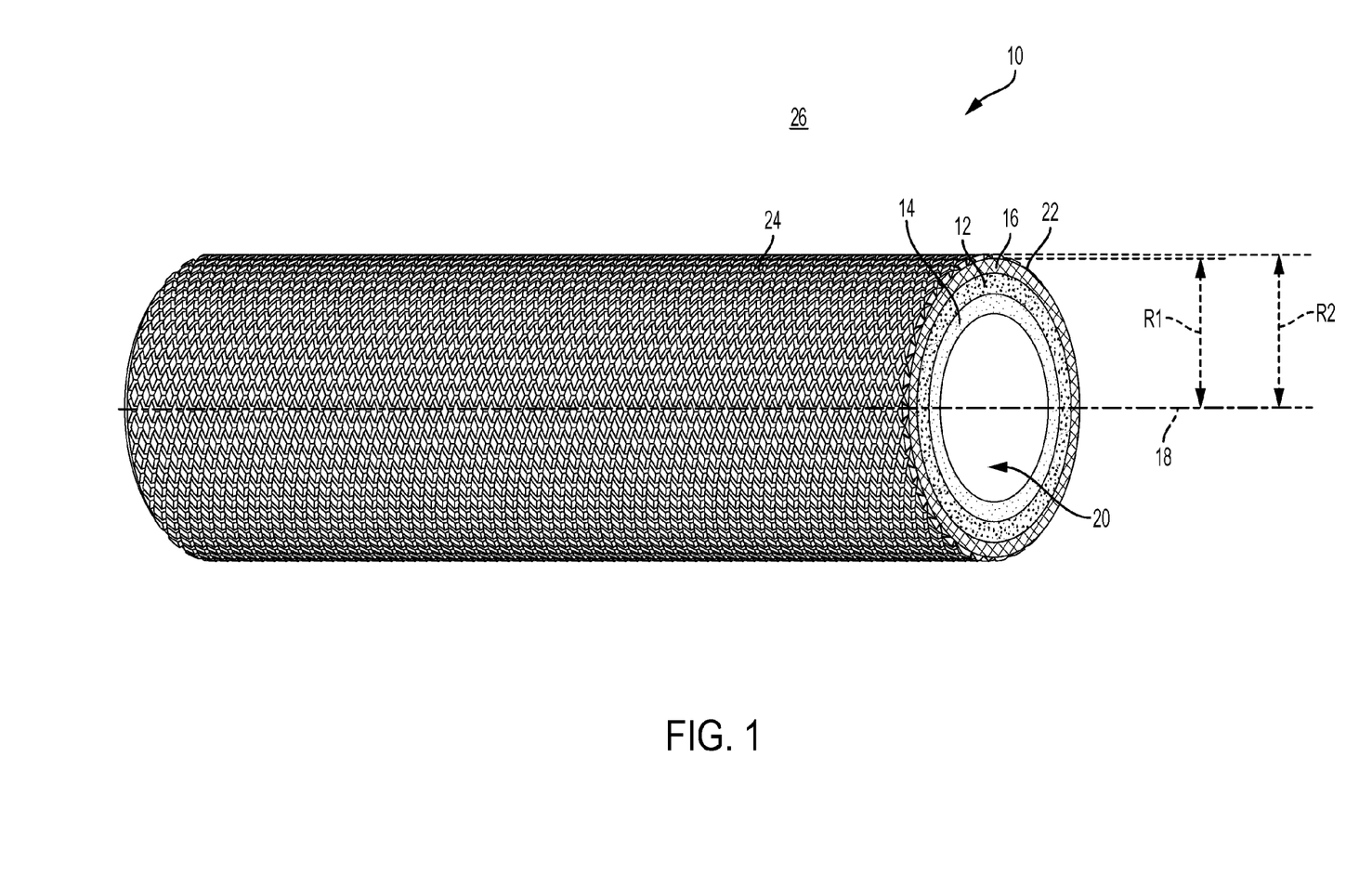
FIG. 1 is a schematic, isometric view of a portion of a hollow composite-material rebar structure, or rebar.
Figure 2:
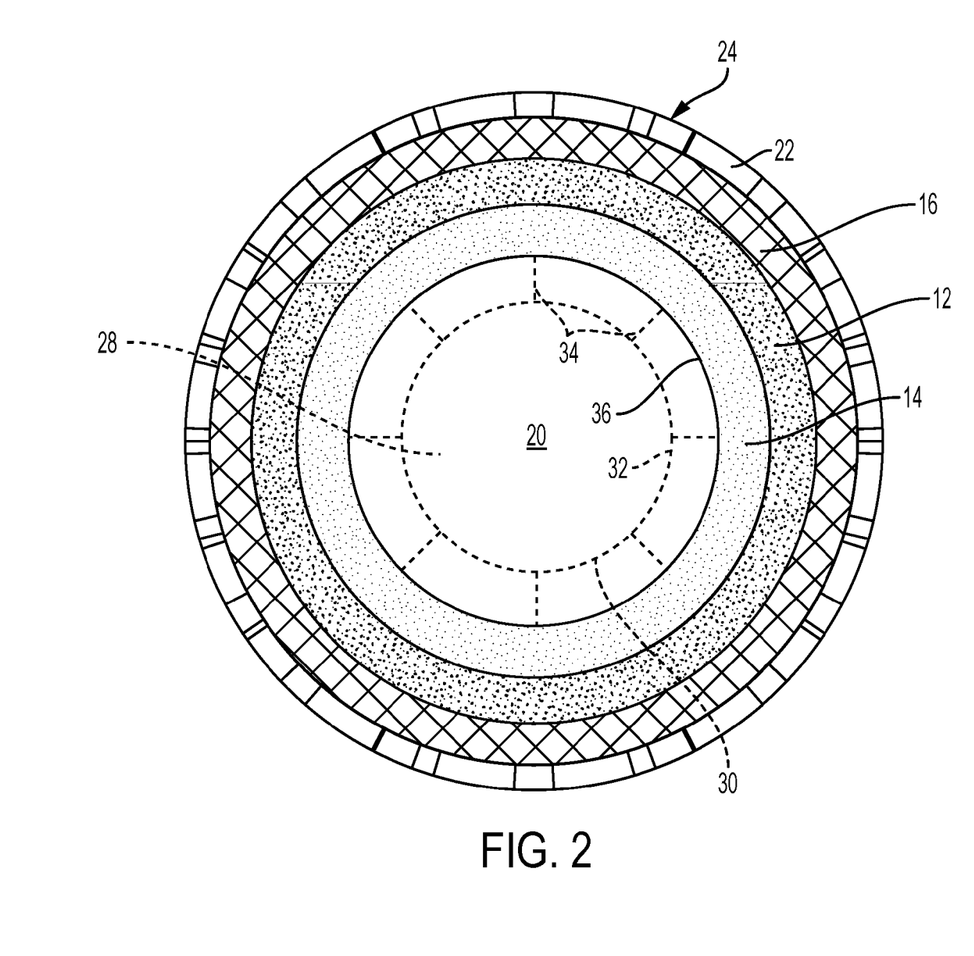
FIG. 2 is a schematic, cross-sectional view of the rebar of FIG. 1.

This example describes an illustrative elongate, hollow, composite-material rebar structure having a plurality of fiber-reinforced layers and various alternative structures, see FIGS. 1-2.

FIG. 1 is a schematic, isometric view of a portion of a hollow, composite-material rebar structure, or rebar, generally indicated at 10. Rebar 10 may include an elongate tubular central wall portion 12, an elongate tubular inner wall portion 14, and an elongate tubular outer wall portion 16. Rebar 10 may have a long core axis 18, a hollow interior space 20, and an external, purchase-enhancing structure 22 on an exterior surface of the rebar.

Elongate central wall portion 12 may be formed circumferentially around a long core axis substantially coincident with the long axis 18 of rebar 10. The central wall portion may have an inside or inner surface defining a hollow interior and an outside or outer surface. Central wall portion 12 may be a composite material formed of fibers and resin.

Central wall portion 12 may be a pultruded structure. It may be formed of any suitable thermoset plastic resin, such as urethane modified vinyl ester, in which are embedded a plurality of fibers whose long axes substantially parallel rebar axis 18. The fibers may be glass fibers, such as E-glass, E-CR glass, or S-glass, or other fiber materials such as basalt or carbon. The long fibers may be distributed evenly throughout the central wall portion and may occupy 77% of the volume of the central wall portion, though other percentages are certainly possible.

The fibers in the central wall portion may be mostly oriented longitudinally parallel to the core axis 18. That is, a percentage of fibers that point substantially parallel to the core axis 18 may be at least 99%, or may be at least 95%, or may be at least 90%, or may be at least 80%, or may be at least 70%, or may be at least 60%, or may be at least 50%. Fibers that point largely along the core axis 18 may be said to be "on axis." The central wall portion may have a thickness of approximately 0.125 inches or a thickness in a range of 0.0625 inches to 0.50 inches, though other ranges are possible.

The central wall portion may account for most of the tensile strength of rebar structure 10. In particular, the long fibers included in the central wall portion may be able to withstand substantial pulling forces.

The resin incorporated into the central wall portion 12 may carry other particulate fillers, for example platy or needle-shaped fillers. These particulate fillers may be oriented randomly and may enhance the load-carrying capabilities of rebar structure 10 along the long axis of the rebar or in other directions. Other additives may be included, for example a catalyst, a release agent, a pigment, or a UV stabilizer, among others. These additives may aid in a curing process, change the visual appearance of the rebar, or increase the stability of the finished product.

Elongate inner wall portion 14 may have a long axis substantially coincident with the long rebar axis 18. The inner wall portion may have an inner surface which may define the hollow interior space 20. The inner wall portion may be bonded to the inside surface of the central wall portion 12. Inner wall portion 14 may be a composite material formed of fiber and resin.

Inner wall portion 14 may be a pultruded structure and may be formed at substantially the same time as the central wall portion. It may be formed of any suitable thermoset plastic resin, such as urethane modified vinyl ester, in which are embedded a plurality of fibers. The resin used for inner wall portion 14 may be the same as the resin used for the central wall portion 12. As with the central wall portion, the resin used for the inner wall portion may include various particulate fillers or additives.

The plurality of fibers in the inner wall portion may include fibers having a long axis substantially parallel to the rebar axis 18. The plurality of fibers may include fibers having long axes that are not parallel to the rebar axis and instead point in random directions having at least one component around the long rebar axis. That is, the inner wall portion may have a higher percentage of fibers oriented non-parallel to the core axis as compared to the central wall portion. Fibers that are substantially non-parallel to the core axis may be said to be "off axis." The fibers may be glass fibers, such as E-glass, E-CR glass, or S-glass, or other fiber materials such as basalt or carbon. The fibers in the inner wall portion may be mostly longer than, for example, one inch, or 0.50 inches, or 1.5 inches per fiber. The inner wall portion may have a thickness of approximately 0.020 inches or a thickness in a range of 0.015 inches to 0.060 inches. The inner wall portion may have an inner diameter in a range of 0.375 inches to 1.0 inches.

A fiber mat, such as a continuous filament fiber mat, may provide such a plurality of fibers. A fiber mat may be a substantially two-dimensional array of glass fibers in the form of a long strip. Such a strip may be wrapped around the long rebar axis 18 and impregnated with resin in order to form the inner wall portion 14, as described below in reference to FIG. 3A. The inner wall portion 14 may be formed of a single mat layer or more than one mat layer.

Texturized rovings may alternately provide a plurality of fibers oriented along the rebar axis and around the rebar axis for use in the inner wall portion 14. Texturized rovings, or bulky or entangled rovings, may include uni-directional rovings that have been air jet entangled or bulked to form a larger diameter strand. A plurality of texturized strands may be included in the inner wall portion 14.

A tubular braided fabric may provide a plurality of fibers having an orientation including a component around the rebar axis for use in the inner wall portion 14. One or more layers of tubular braided fabric may be included in the inner wall portion 14.

Whether using a fiber mat material, texturized rovings, or tubular braided fabric for inner wall portion 14, the inner wall portion may increase the strength of rebar 10 in a radial direction perpendicular to the long rebar axis 18. The fibers which are oriented in a direction having a component around the rebar axis may account for increased strength in the radial direction.

Elongate outer wall portion 16 may have a long axis substantially coincident with the long axis 18 of rebar 10 and an outer surface. The outer wall portion may be bonded to the outer surface of the central wall portion 12. Outer wall portion 12 may be a composite material formed of fibers and resin.

Outer wall portion 16 may be a pultruded structure and may be formed at substantially the same time as the central wall portion and the inner wall portion. The outer wall portion may be bonded to the outside surface of the central wall portion. Outer wall portion 16 may be substantially similar to inner wall portion 14, with the exception of their being on opposite sides of the central wall portion. That is, the plurality of fibers in the outer wall portion may be oriented such that they have components both along the rebar axis 18 and around the rebar axis, or so that a higher percentage of fibers are oriented non-parallel to the cored axis as compared to the central core. Such a plurality of fibers may be provided by a fiber mat, a plurality of texturized rovings, or one or more tubular braided fabrics. The fibers in the outer wall portion may be mostly longer than, for example, one inch, 0.50 inches, or 1.50 inches per fiber. The outer wall portion may have a thickness of approximately 0.020 inches or a thickness in a range of 0.015 inches to 0.060 inches.

Whether using a fiber mat material, texturized rovings, or tubular braided fabric for outer wall portion 16, the outer wall portion may increase the strength of rebar 10 in a radial direction perpendicular to the long rebar axis 18. The fibers which are oriented in a direction having a component around the rebar axis may account for increased strength in the radial direction.

The external purchase-enhancing structure 22 may be formed on an external surface 24 of rebar 10, for example on the outer surface of the outer wall portion 16. The structure may be formed at substantially the same time as the outer wall portion or the central wall portion. The external purchase-enhancing structure may be a three-dimensional structure of voids and material that extends between an inner radius R1 and an outer radius R2 along the length of rebar 10. The difference between radius R1 and radius R2 may be substantially exaggerated in the schematic diagram of FIG. 1. The structure may form a repeating pattern on the surface or the pattern may be irregular. The structure may be formed of elongate grooves, valleys, or channels in the surface or discrete pockets, holes or voids in the surface, among others.

The external purchase enhancing structure 22 may have a granular form. That is, the structure 22 may have a characteristic length scale as measured in directions azimuthally around the core axis or longitudinally along the core axis. For example, in the exemplary structure depicted in FIG. 1, there is a characteristic length between any two adjacent grooves. This characteristic length is approximately the same as the distance between any two adjacent rises in the structure. The external purchase-enhancing structure 22 may be granular in the sense that the characteristic length scale of the structure is small as compared to the diameter of the rebar itself. Such a granular structure is more smoothly distributed along the surface of the rebar.

Another granular alternative for the external purchase enhancing structure 22 is for the outermost surface of the rebar to have a three-dimensional structure that is the result of particles, such as sand, silica, or other particulates, embedded within the resin of the rebar. The distribution of such particles may be continuous or smooth over the surface of the rebar while the surface of the rebar itself may be discontinuous or rough due to the granular nature of the embedded particles themselves.

In contrast, external purchase enhancing structures that have the form of one or two helical winds that progress along the outside surface of the rebar could not be said to be granular. What one normally thinks of as standard metal rebar may fall in to this case. In these cases the characteristic length scale of the external structure, i.e. the distance between any two helixes, would be comparable to the diameter of the rebar itself. Such structures are not smoothly distributed over and along the surface of the rebar.

The physical structure of the external purchase-enhancing structure 22 may be formed by resin, for example, the thermoset resin included in the outer wall portion 18. As described further in reference to FIG. 3A below, the outer wall portion 18 may be formed by impregnating fiber with resin. A portion of this resin may separate from the fibers included in the outer wall portion and harden, thereby forming the external purchase-enhancing structure 22.

Rebar 10 may be operatively disposed with a volume of concrete or some other material 26. The presence of an external purchase-enhancing structure 22 may aid in a mechanical bond between the rebar and the material surrounding it. In the example of rebar 10 reinforcing a concrete structure, the rebar structure may be held in place while liquid concrete is poured into the volume surrounding the rebar to subsequently harden. When the liquid concrete surrounds the rebar structure, the concrete may complementarily fill in the voids in the external purchase-enhancing structure.

FIG. 2 is a schematic, cross-sectional view of rebar 10 of FIG. 1. FIG. 2 is schematic in the sense that the relative thicknesses of the various layers and structures of rebar 10 should not be taken literally in FIG. 2, or FIG. 1. Various alternative embodiments will now be discussed in reference to FIG. 2.

In one alternative embodiment inner wall portion 14 may be omitted. In this case the hollow interior 20 of the rebar structure 10 may be defined by the inner surface of the central wall portion 12. The outer wall portion 16 may account for increased strength in the radial direction in this alternative embodiment.

In another alternative embodiment outer wall portion 16 may be omitted. In this case the external purchase-enhancing structure 22 may be formed on the outer surface 24 of the central wall portion 12. As both the central wall portion and the outer wall portion may be formed of fibers and resin, the physical structure of the external purchase-enhancing structure may be the same whether the outer wall portion is included or not. The inner wall portion 14 may account for increased strength in the radial direction in this alternative embodiment.

In another alternative embodiment the hollow interior space 20 of the rebar may be filled with a reinforcing core structure such as an expandable foam material 28. This expanding foam may be applied within the interior space after the hollow rebar structure 10 has been formed. Such a foam material may support the hollow rebar structure and increase the strength of the rebar in the radial direction. This benefit may be obtained without substantially altering the weight of the rebar. An expanding foam material may be included whether or not the inner wall portion 14 is included in rebar 10.

In another alternative embodiment, the hollow interior space 20 of the rebar may include a reinforcing core structure such as a thermoplastic pipe 30. The thermoplastic pipe may have a "wagon wheel"-type configuration as indicated in dashed lines in FIG. 2. Thermoplastic pipe 30 may include an inner cylinder 32, a plurality of spokes 34 having radial and longitudinal dimension, and an outer cylinder 36. In the case where rebar 10 includes the inner wall portion 14, the outer cylinder 36 may be bonded to the inner surface of the inner wall portion. In the case where rebar 10 does not include the inner wall portion 14, the outer cylinder 36 may be bonded to the inner surface of the central wall portion 12. Such a thermoplastic reinforcing pipe 30 may support the hollow rebar structure 10 and may increase the strength of the rebar in the radial direction. This benefit may be obtained without substantially altering the weight of the rebar, while further maintaining the advantageous hollow nature of the rebar.

It should be understood that more than one of these alternatives may be combined. That is, a finished rebar product may include one or more of the following: the inner wall portion 14, the outer wall portion 16, a foam material 28, and/or a thermoplastic pipe 30. These alternative embodiments will be further discussed in reference to FIGS. 3A, 3B, and 4.

The exemplary embodiment shown schematically in FIGS. 1 and 2 has a circular cross section. Other cross sectional shapes are also possible, such as rectangles, other polygons, or other irregular shapes. Further, the thicknesses of the various layers and structures of the exemplary embodiment of FIGS. 1 and 2 are shown to be constant around the rebar. Other embodiments are also possible where the thickness of one or more layers or structures change around the rebar or along its length.

Example 2

Figure 3A:
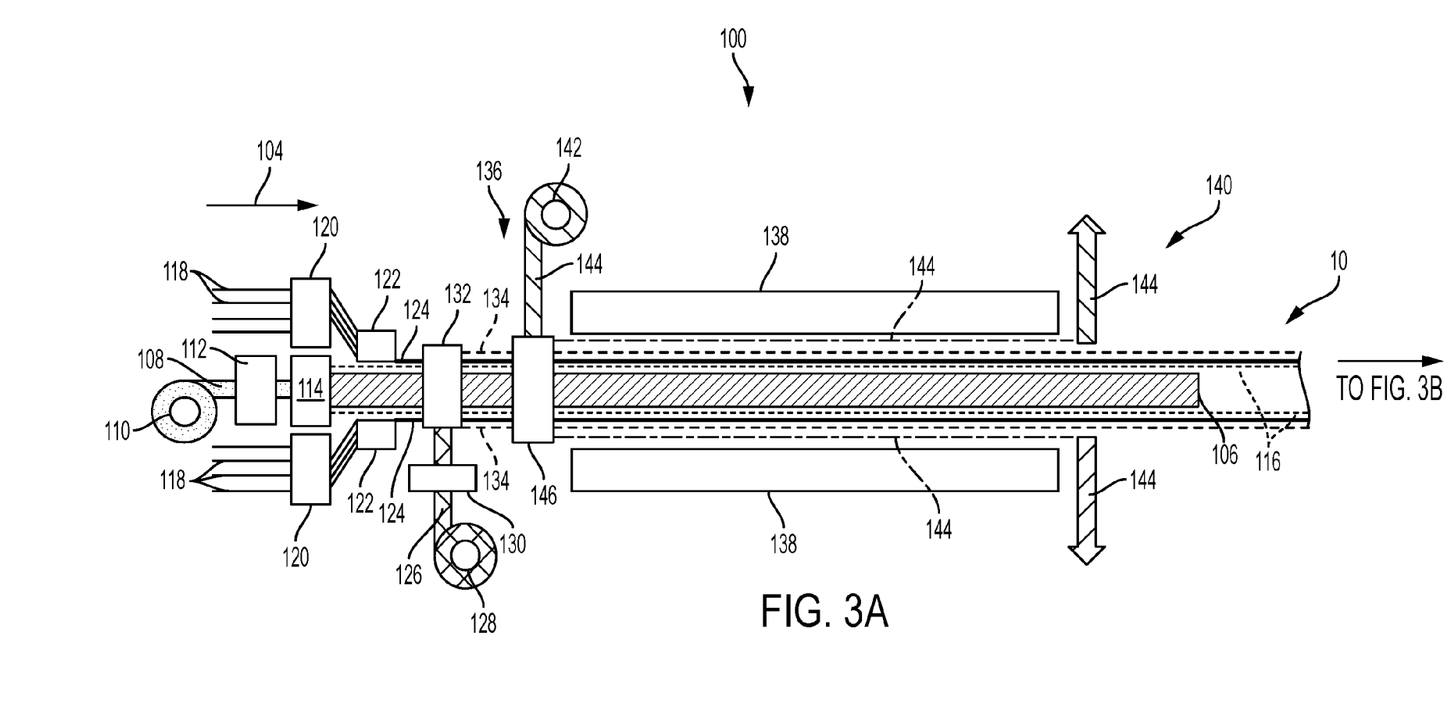
FIGS. 3A and 3B together are a schematic view of a hollow composite-material rebar structure manufacturing apparatus.
Figure 3B:
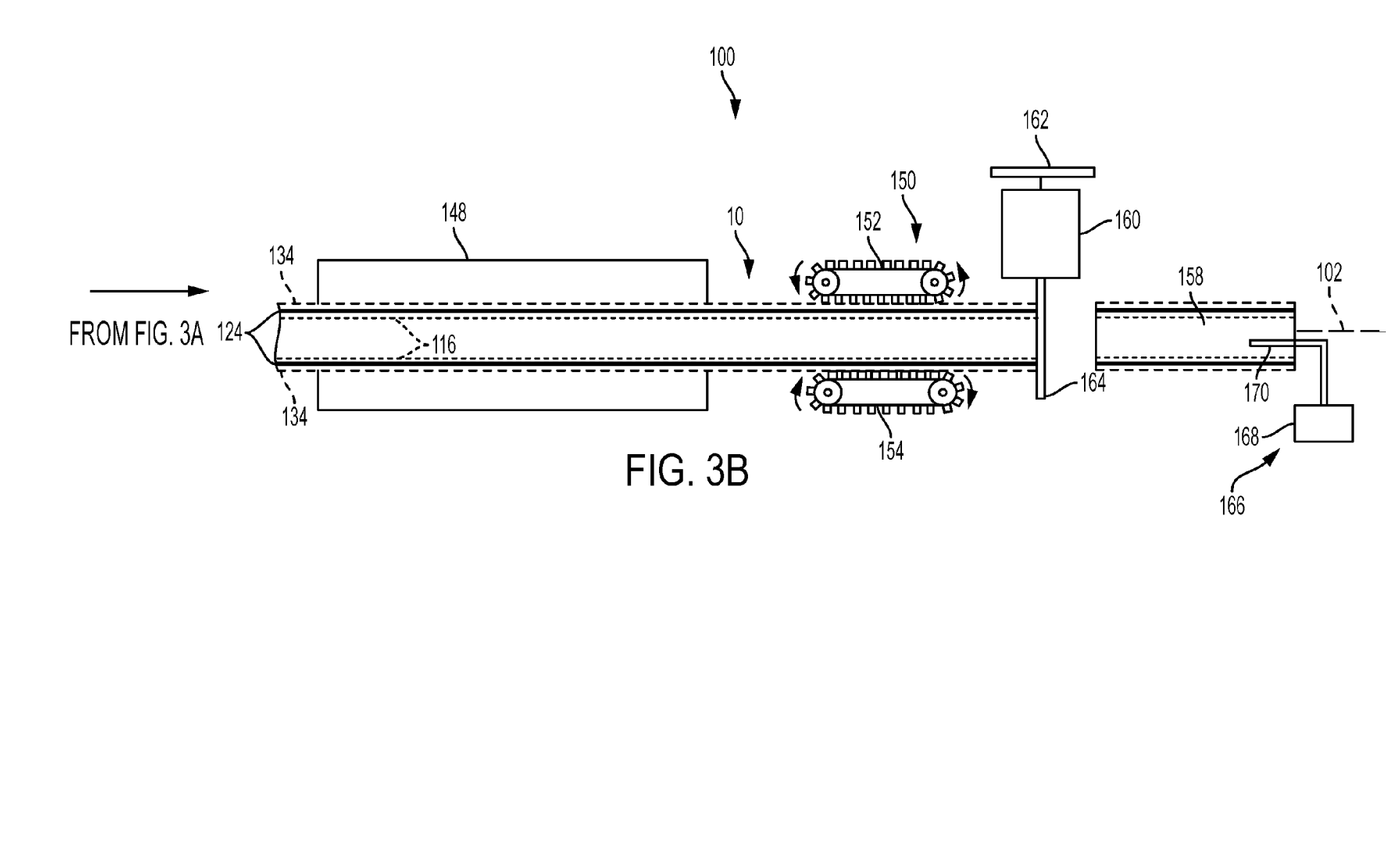

This example describes an illustrative apparatus configured to make a hollow, composite-material rebar structure having a plurality of fiber-reinforced layers, see FIGS. 3A-3B.

FIGS. 3A and 3B together are a schematic view of a pultrusion apparatus, generally indicated at 100, configured to manufacture a hollow, composite-material, rebar structure, such as rebar structure 10 shown in FIGS. 1 and 2. FIGS. 3A and 3B are linked laterally, so that the right side of FIG. 3A corresponds to the left side of FIG. 3B. Apparatus 100 may define a processing path beginning from an upstream region near the left edge of FIG. 3A and continuing to a downstream region near the right edge of FIG. 3B. The processing path may be aligned with and proceed along a rebar-formation axis 102, seen near the downstream region at the right side of FIG. 3B. Material may move through apparatus 100 generally in direction shown by arrow 104 in FIG. 3A.

Apparatus 100 may include an internal support structure 106. In one example, the internal support structure 106 may be a mandrel, though other possibilities are described below. Mandrel 106 may be a solid or hollow cylinder around which a hollow rebar structure is formed. Mandrel 106 may be anchored in place proximate the upstream end of apparatus 100 and may extend towards said downstream region, and may have a long axis which is substantially coincident with rebar formation axis 102. The outer diameter of the mandrel may define the diameter of the hollow interior of the rebar created in apparatus 100. The mandrel may have any appropriate cross section depending on the desired shape of the hollow interior of the rebar structure.

Apparatus 100 may be configured to create a hollow rebar structure where the rebar includes a plurality of different layers, some of which may be composites of fibers and resin. The different layers of composite material may be applied sequentially around mandrel 106, thereby building a multi-layer structure from the inside out. The various layers of the rebar structure may form the walls of the hollow rebar.

A first layer applied to mandrel 106 may form an inner wall portion including fibers and resin, such as inner wall portion 14 in FIGS. 1 and 2. Multi-directional fibers 108 may be dispensed from a spool or spools 110 and may pass through a fiber-bathing resin station 112 to a resin-wetted fiber guide 114 configured to position the multi-directional fibers around the mandrel 106 in an uncured inner layer. The multi-directional fibers may have substantially random orientations, with each individual fiber section pointing in a direction that is some combination of a longitudinal direction along the rebar-formation axis 102, an azimuthal direction around the rebar-formation axis, and a radial direction away from the rebar-formation axis. In an alternate embodiment of apparatus 100, fiber-bathing resin station 112 may be omitted and the fibers may be dry when positioned around mandrel 106. The uncured inner layer may then gain resin due to proximity with an uncured central layer disposed over the uncured inner layer discussed below.

An example of multi-directional fibers 108 may be a substantially two-dimensional strip of a fiber mat material. These fibers may form a mat or web of fibers that point substantially in combinations of the longitudinal and azimuthal directions. In this case, the resin-wetted fiber guide 114 may wrap the soaked mat material around mandrel 106. The fiber mat may be sized so as to wrap slightly more than once around mandrel 106. Fiber mat 108 and the associated resin together may form an inner wall portion of the hollow rebar structure, indicated in dotted lines at 116 in FIGS. 3A and 3B. More than one layer of fiber mat and resin may be applied.

Another example of multi-directional fibers 108 may be a plurality of texturized rovings. As described above in reference to FIG. 1, these texturized rovings may include fibers which point in a direction substantially aligned with the rebar-formation axis 102 as well as fibers which point in directions which are combinations of the longitudinal, azimuthal, and radial directions. In this case, the resin-wetted fiber guide 114 may position the soaked texturized rovings around the mandrel so as to form a substantially two-dimensional layer around the circumference of the mandrel. This layer is indicated in dotted lines at 116 in FIGS. 3A and 3B.

As described in reference to FIG. 2, an alternative hollow rebar structure may not include inner wall portion 116. In this case, the multi-directional fibers 108 may not be applied to mandrel 106.

Continuing the discussion of apparatus 100, a central wall portion including fibers and resin may be applied over the inner wall portion 116. In the case where inner wall portion 116 is omitted, the central wall portion may be applied directly over the mandrel 106. A plurality of substantially uni-directional fibers, bundles of fibers, or rovings 118 may pass through a fiber-bathing station 120 and through a resin-wetted fiber guide or condenser 122 configured to arrange the resin-soaked fibers in a layer around the inner wall portion 116 or mandrel 106 to form an uncured central layer. Fibers 118 and the associated resin together may form a central wall portion of a hollow rebar structure, such as central wall portion 12 in FIGS. 1 and 2, indicated in solid black lines at 124 in FIGS. 3A and 3B. The fibers in the uncured central layer may be oriented mostly parallel to the rebar-formation axis.

An outer wall portion including fibers and resin may be applied over the central wall portion 124. Multi-directional fibers 126 may be dispensed from a spool or spools 128 and may pass through a fiber-bathing resin station 130 to a resin-wetted fiber guide 132 configured to position the multi-directional fibers around the central wall portion 124 in an uncured outer layer. The multi-directional fibers 126 may be similar to the multi-directional fibers 108. As with multi-directional fibers 108, fiber mat material or a plurality of texturized rovings may be used, along with the associated resin, to create the outer wall portion, indicated in dashed lines at 134 in FIGS. 3A and 3B.

The specific kind of multi-directional fiber used in the inner and outer wall portions needs not be identical. For example, texturized rovings may be used for the inner wall portion, while a fiber mat material may be used of the outer wall portion. In the case where a fiber mat material is used, the resin-wetted fiber guide 114 may be configured to wrap the fiber mat around the central wall portion slightly more than once.

As described in reference to FIG. 2, an alternative hollow rebar structure may not include outer wall portion 134. In this case, the multi-directional fibers 126 may not be applied to the central wall portion 124.

In an alternate embodiment of apparatus 100 the functions of one or more of the resin-wetted fiber guides 114, 122 and 132 may be combined into a single guide configured to form the uncured inner, central, and outer layers. One or more of the fiber-bathing resin stations 112, 120, and/or 130 may be combined into a single resin station.

Apparatus 100 may be configured to create an external purchase-enhancing structure on the outside of the hollow rebar structure. To create this structure, a peel ply material, a texturized material, or a material with a degree of porosity may be applied to the hollow rebar structure before it is cured and then later removed after the rebar has been at least partially cured. For example, apparatus 100 may include a peel ply application assembly 136, a pultrusion die 138, and a peel ply removal assembly 140.

Peel ply application assembly 136 may be disposed upstream of pultrusion die 138 and downstream of wrapping station 132 and/or fiber condenser 122. Peel ply application assembly 136 may include a spool 142 configured to dispense a textured material 144 such as a peel ply material or some other material with a degree of porosity. Textured material 144 may be wrapped around the outermost layer of the uncured hollow rebar structure, for example the outer wall portion 134 or the central wall portion 124, at wrapping station 146. Textured material 144 may be wrapped at least once around the uncured hollow rebar structure. As the underlying layers of the uncured rebar structure may include liquid resin, a portion of this liquid resin may be drawn into the textured material and fill in the gaps, voids, or pores inherent in the textured material 144.

Pultrusion die 138 may have a long axis which is substantially coincident with the rebar-formation axis 102 and may circumsurround mandrel 106. The hollow rebar structure may be substantially formed and cured within the region between the pultrusion die and the mandrel. The pultrusion die may include zones or regions, spaced along the processing path from one another, designed to transform the uncured layers of fiber and liquid resin, at least partially, into a solid cured hollow rebar structure between the upstream end of the die and the downstream end. For example, pultrusion die 138 may include a cooling zone configured to cool the liquid resin, or one or more heating zones configured to at least partially cure the resin. The temperatures in these zones, as well as the throughput speed of the rebar structure, may be controlled in order to achieve a desired degree of curing by the time the rebar exits pultrusion die 138. It may be advantageous to have the rebar exit the pultrusion die in a less than 100% cured state or a completely cured state.

Peel ply removal assembly 140 may be disposed downstream of the pultrusion die. Peel ply removal assembly may be configured to remove the textured material 144 from, as is indicated schematically by the arrows directing material 144 away from the rebar-formation axis. The gaps or voids of the purchase-enhancing structure on the outside of the hollow rebar structure may correspond to the locations of the textured material inside the pultrusion die. Similarly, the solid components of the purchase-enhancing structure may correspond to the voids or gaps inherent to the textured material. It may be easier to remove the texture material from the rebar structure if the rebar exits the pultrusion die in a less than 100% cured state. In this case, the rebar may be brought to its fully cured state in an oven 148 disposed downstream from the peel ply removal assembly 140.

Apparatus 100 may be configured to create an external purchase-enhancing structure in other ways as well. For example, particles or granules such as sand may be applied to the uncured outer structure of the rebar before the rebar enters the pultrusion die 138. For example, at wrapping station 146 particles may be disposed around the uncured outermost layer of the rebar. These particles may then be embedded within the resin inherent to the outermost layer. Once cured within the pultrusion die this combination of resin and granules may form the external purchase-enhancing structure of the rebar.

Hollow rebar structure 10 may proceed downstream from the pultrusion die through oven 148 where curing of the rebar may be completed. In the case where the rebar emerged from the pultrusion die in a 100% cured state oven 148 may be omitted. The temperature of oven 148 and the length of time each section of the rebar structure spends in oven 148 may be controlled so as to have the rebar exit oven 148 in a completely or fully cured state.

A puller 150 may be disposed downstream of oven 148. Puller 150 may be configured to pull the traveling rebar materials through apparatus 100. The puller may be a crawler-tread or caterpillar-style puller including a pair of endless treads 152 and 154 configured to grip and pull rebar structure 10 through apparatus 100. Other pulling apparatuses may also be appropriate as would be familiar to a person skilled in the art.

Apparatus 100 may include a chopping assembly 156 disposed downstream of puller 150. The chopping assembly may be configured to separate the hollow rebar structure into shorter sections, for example hollow composite-material rebar product 158. Chopping assembly 156 may include a chop saw 160 mounted on a rail structure 162 and a saw blade 164. The chop saw 160 may be configured to move along the rail structure at the same speed as the rebar structure as it moves through apparatus 100. Thus, there may be no relative motion between the chop saw and the rebar as the rebar is being cut into pieces. Once a cut has been completed, the chop saw may return to an upstream end of the rail structure and wait there until such a time as another cut is needed.

As described in reference to FIG. 2, it may be advantageous to fill the hollow interior of a rebar product with an expanding foam in order to increase the radial strength of the product. An expanding foam may be injected into a hollow rebar product 158 via a foam injection apparatus 166 which may be disposed downstream of chopping assembly 156. Foam injection apparatus 166 may include a reservoir 168 and a nozzle 170 configured to fill the interior of hollow rebar product with expanding foam.

An alternative method for injecting expanding foam into the hollow interior of the rebar structure is to employ a hollow mandrel 106 and direct the foam material through the hollow mandrel in direction 104 and out the downstream end of mandrel 106. The expanding foam may then fill the hollow interior of the uncut rebar structure.

As described in reference to FIG. 2, another embodiment of a hollow rebar structure may include a thermoplastic pipe within the hollow interior of either the inner wall portion or the central wall portion in the case where the inner wall portion is omitted. Apparatus 100 may create such an embodiment by including internal support structure 106 as a thermoplastic pipe. Where a mandrel may be anchored in place within apparatus 100, thermoplastic pipe may be allowed to move through apparatus 100 at the same speed as the other materials. In this case either the inner wall portion 116 or the central wall portion 124 may then be applied directly to the thermoplastic pipe and proceed though apparatus 100 as described above. Thermoplastic pipe may need to be continuously introduced at the upstream end of apparatus 100.

Example 3

Figure 4:
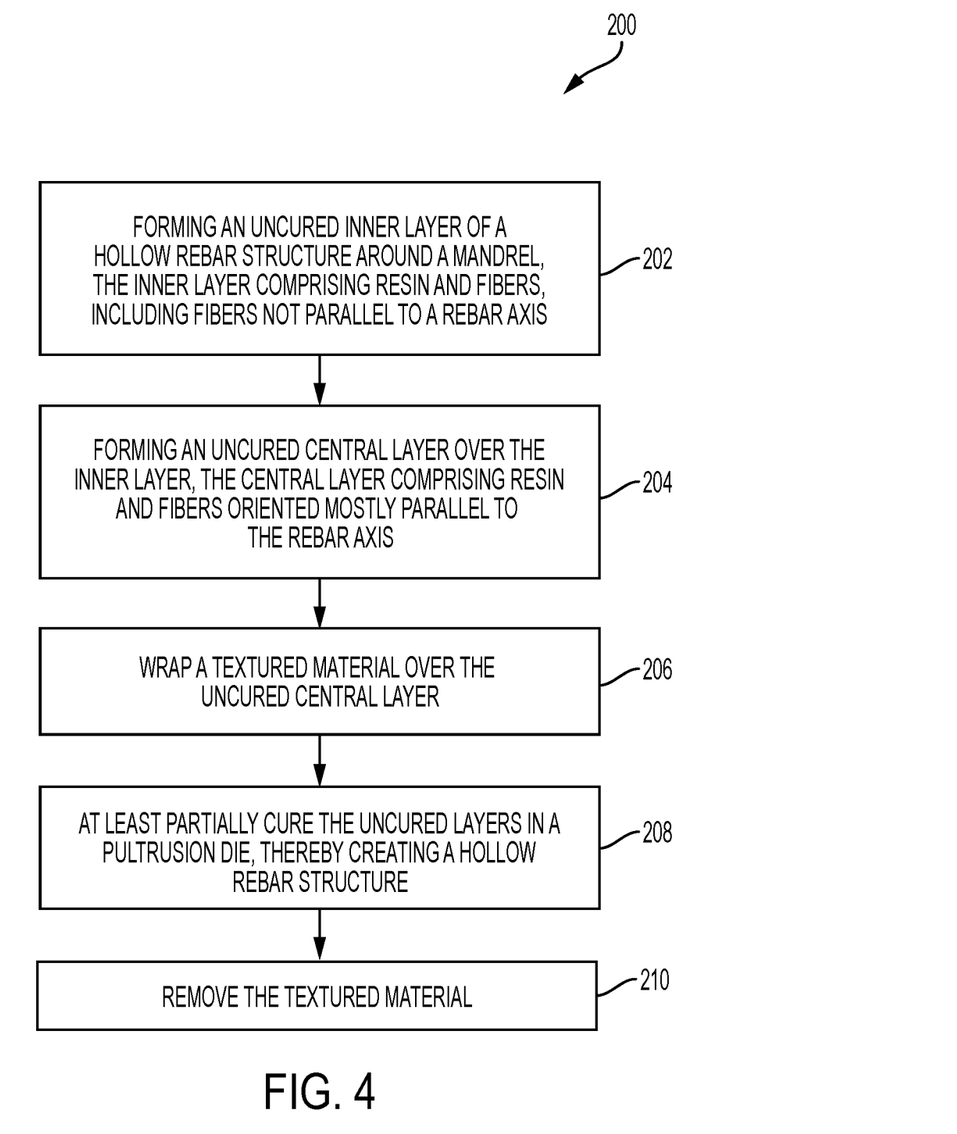
FIG. 4 is a flow chart illustrating a method of making a hollow composite-material rebar structure.

This example describes an illustrative method of manufacturing a hollow rebar structure having a plurality of fiber-reinforcing layers, which may be used in conjunction with any of the apparatuses described herein; see FIG. 4.

FIG. 4 depicts multiple steps of a method, generally indicated at 200, for making a hollow rebar structure. Method 200 may be used by apparatus 100 depicted and described in reference to FIGS. 3A and 3B to create the hollow rebar structure 10 depicted and described in reference to FIGS. 1 and 2. Any implementation of method 200 may proceed along a processing path from an upstream end or region to a downstream end or region. Although various steps of method 200 are described below and depicted in FIG. 4, the steps need not necessarily all be performed, and in some cases may be performed in a different order than the order shown.

Method 200 may include a step 202 of forming an uncured inner layer of a hollow tubular rebar structure around an internal support structure, such as a mandrel or a thermoplastic pipe, and a core axis. The inner layer may be formed along a processing path and upstream of a pultrusion die and may be formed of resin and glass or carbon fibers. The uncured inner layer may be formed by impregnating or saturating the inner fiber mat-material or texturized rovings with resin and disposing those resin-soaked fibers around a mandrel.

As described in reference to FIGS. 3A and 3B, the inner fiber mat-material may be replaced with a plurality of multi-directional fiber rovings. Further, the inner fiber mat-materials may be omitted entirely from the uncured hollow rebar structure.

Method 200 may include a step 204 of forming an uncured central layer of the hollow tubular rebar structure around the uncured inner layer. The central layer may be formed upstream from the pultrusion die and may include resin and glass or carbon fibers oriented mostly parallel to the core axis. The inner layer may have a higher percentage of fibers oriented non-parallel to the core axis as compared to the central layer.

Method 200 may optionally include a step of forming an uncured outer layer of the hollow tubular rebar structure around the uncured central layer. The outer layer may be formed upstream from the pultrusion die, and may include resin and glass or carbon fibers. The outer layer may have a higher percentage of fibers oriented non-parallel to the core axis as compared to the central layer.

Method 200 may include a step 206 of wrapping a textured material around the uncured pre-assembly. If the uncured pre-assembly includes an outer layer of resin and multi-directional fibers the textured material may be wrapped around this outer layer. If the uncured pre-assembly does not include an outer layer of resin and multi-directional fibers the textured material may be wrapped around the central layer of resin and uni-directional roving material. The textured material may be wrapped around the uncured pre-assembly upstream of the pultrusion die.

Method 200 may include a step 208 of at least partially curing the pre-assembly in a pultrusion die, thereby creating a hollow rebar structure. That is, through at least a partial curing process the uncured pre-assembly may be turned into a hollow rebar structure. In anticipation of the next step in method 200, it may be advantageous to have the hollow rebar structure exit the pultrusion die in a less than 100% cured state.

Method 200 may include a step 210 of removing the textured material from the hollow rebar structure. This may be accomplished downstream of the pultrusion die. Removing the textured material may include peeling the material from the surface of the rebar. The removal process may be easier if the rebar is in a less than 100% cured state. In such a case the rebar structure may be additionally cured in an oven downstream of where the textured material is removed.

Steps 206, 208, and 210 may be taken together as forming a purchase-enhancing structure on the exterior of the rebar. These steps may leave a permanent granular external texture to the rebar after curing.

Method 200 may include other optional steps not shown in FIG. 4, such as injecting expanding foam into the hollow interior of the hollow rebar structure. This may be accomplished downstream from removing the textured material.

Example 4

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A rebar structure for concrete reinforcement, comprising:

an elongate tubular central wall portion having an inside surface and an outside surface, formed circumferentially around a core axis, the central wall portion including glass or carbon fibers mostly being oriented longitudinally parallel to the core axis, and an inner wall portion bonded to the inside surface of the central wall portion, the inner wall portion including glass or carbon fibers, the inner wall portion having a higher percentage of fibers oriented non-parallel to the core axis as compared to the central wall portion.

A2. The rebar structure of paragraph A1, further comprising an elongate tubular outer wall portion bonded to the outside surface of the central wall portion, the outer wall portion including glass or carbon fibers, the outer wall portion having a higher percentage of fibers oriented non-parallel to the core axis as compared to the central wall portion.

A3. The rebar structure of paragraph A2, wherein the fibers in the inner and outer wall portions are mostly longer than one inch per fiber.

A4. The rebar structure of paragraph A1, wherein the inner wall portion is comprised of a fiber mat.

A5. The rebar structure of paragraph A1, wherein the inner wall portion is comprised of texturized rovings.

A6. The rebar structure of paragraph A1, wherein the outside surface of the central wall portion has a purchase enhancing structure.

A7. The rebar structure of paragraph A6, wherein the purchase enhancing structure has a granular form.

A8. The rebar structure of paragraph A2, wherein the outside surface of the outer wall portion has a purchase enhancing structure.

A9. The rebar structure of paragraph A6, wherein the purchase enhancing structure has a granular form.

A10. The rebar structure of paragraph A1, further comprising a reinforcing core structure inside the inner wall portion.

A11. The rebar structure of paragraph A10, wherein the reinforcing core structure includes a wagon wheel configuration.

A12. The rebar structure of paragraph A10, wherein the reinforcing core structure includes an expandable foam.

A13. The rebar structure of paragraph A1, wherein the inner wall portion has a thickness in a range of 0.015 inches to 0.060 inches.

A14. The rebar structure of paragraph A1, wherein the central wall portion has a thickness in a range of 0.625 inches to 0.50 inches.

A15. The rebar structure of paragraph A2, wherein the outer wall portion has a thickness in a range of 0.015 inches to 0.60 inches.

A16. The rebar structure of paragraph A1, wherein the inner wall portion has an inner diameter in a range of 0.375 inches to 1.0 inches.

B1. A rebar structure for concrete reinforcement, comprising, an elongate tubular central wall portion having an inside surface and an outside surface, formed circumferentially around a core axis, the central wall portion including glass, carbon, or basalt fibers mostly being oriented longitudinally parallel to the core axis, an inner wall portion bonded to the inside surface of the central wall portion, the inner wall portion including glass, carbon, or basalt fibers having a higher percentage of fibers oriented non-parallel to the core axis as compared to the central wall portion.

an outer wall portion bonded to the outside surface of the central wall portion, the outer wall portion including glass, carbon, or basalt fibers having a higher percentage of fibers oriented non-parallel to the core axis as compared to the central wall portion.

C1. A method of making rebar, comprising:

forming an uncured inner layer of a hollow tubular rebar structure around a mandrel and a core axis, along a processing path, upstream from a pultrusion die, the inner layer comprising resin and glass or carbon fibers, forming an uncured central layer of the hollow tubular rebar structure around the uncured inner layer, upstream from the pultrusion die, the central layer comprising resin and glass or carbon fibers oriented mostly parallel to the core axis, the inner layer having a higher percentage of fibers oriented non-parallel to the core axis as compared to the central layer.

C2. The method of paragraph C1, further comprising forming an uncured outer layer of the hollow tubular rebar structure around the uncured central layer, upstream from the pultrusion die, the outer layer comprising resin and glass or carbon fibers, the outer layer having a higher percentage of fibers oriented non-parallel to the core axis as compared to the central layer.

C3. The method of paragraph C1, further comprising
forming a purchase-enhancing structure on the exterior of the rebar.

C4. The method of paragraph C1, wherein the step of forming a purchase-enhancing structure includes wrapping a textured material around an external surface of the uncured rebar structure upstream of the pultrusion die and removing the textured material downstream of the pultrusion die, thereby leaving a permanent granular external texture to the rebar after curing.

C5. The method of paragraph C1, wherein the inner layer comprises a mat material.

C6. The method of paragraph C1, wherein the inner layer comprises texturized rovings.

C7. The method of paragraph C4, wherein the hollow rebar structure is partially cured in the pultrusion die and fully cured in an oven disposed downstream of removing the textured material.

D1. An apparatus for making an elongate, composite-material rebar structure, said apparatus having a rebar-formation axis and upstream and downstream regions disposed at spaced locations along said axis, said apparatus comprising:
an elongate mandrel having a long axis which is substantially coincident with said rebar-formation axis, extending from said upstream region toward said downstream region;
an inner guide configured to form an uncured inner layer around the mandrel comprising resin and glass or carbon fibers;
a central guide downstream of the inner guide configured to form an uncured central layer around the uncured inner layer comprising resin and glass or carbon fibers, the central layer having fibers oriented mostly parallel to the rebar-formation axis and the inner layer having a higher percentage of fibers oriented non-parallel to the core axis as compared to the central layer;
a pultrusion die having a long axis which is substantially coincident with the rebar-formation axis, circumsurrounding the mandrel, configured to form an elongate, composite, hollow rebar structure including the inner layer and the central layer, disposed downstream of the inner guide and the central guide.

D2. The apparatus of paragraph D1, further comprising
a peel/ply application assembly disposed upstream of the pultrusion die and configured to wrap a textured material over the uncured central layer.

D3. The apparatus of paragraph D2, further comprising
a peel/ply removal assembly disposed downstream of the pultrusion die and configured to remove the textured material from the hollow rebar structure.

D4. The apparatus of paragraph D3, wherein the pultrusion die is configured to cure the hollow rebar structure to a less-than 100% cured state and further comprising
an oven disposed downstream of the peel-ply removal assembly, the oven configured to cure the hollow rebar structure to a fully cured state.

D5. The apparatus of paragraph D1, further comprising
an outer guide configured to form an uncured outer layer around the uncured central layer comprising resin and glass or carbon fibers, the outer layer having a higher percentage of fibers oriented non-parallel to the core axis as compared to the central layer.

Advantages, Features, Benefits

The different embodiments of the hollow rebar structure and associated fabrication apparatus described herein provide several advantages over known solutions for reinforcing concrete structures. For example, the illustrative embodiments of the hollow rebar structure described herein allow for increased strength in the radial direction. Additionally, and among other benefits, illustrative embodiments of the hollow rebar structure described herein allow an increase resistance to pull-out. No known system or device can perform these functions. However, not all embodiments described herein provide the same advantages or the same degree of advantage.

Conclusion

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A rebar structure for concrete reinforcement, comprising:
an elongate tubular central wall portion having an inside surface and an outside surface, formed circumferentially around a core axis, the central wall portion including fibers comprising at least one of glass, carbon, and basalt, the fibers mostly being oriented longitudinally parallel to the core axis, and
an inner wall portion bonded to the inside surface of the central wall portion, the inner wall portion including a continuous filament fiber mat of randomly oriented glass or carbon fibers, the inner wall portion having a higher percentage of fibers oriented non-parallel to the core axis as compared to the central wall portion.

2. The rebar structure of claim 1, further comprising
an elongate tubular outer wall portion bonded to the outside surface of the central wall portion, the outer wall portion including fibers comprising at least one of glass, carbon, and basalt, the outer wall portion having a higher percentage of fibers oriented non-parallel to the core axis as compared to the central wall portion.

3. The rebar structure of claim 2, wherein the fibers in the inner and outer wall portions are mostly longer than one inch per fiber.

4. The rebar structure of claim 2, wherein the outside surface of the outer wall portion has a purchase enhancing structure.

5. The rebar structure of claim 4, wherein the purchase enhancing structure has a granular form.

6. The rebar structure of claim 1, wherein the inner wall portion is comprised of texturized rovings.

7. The rebar structure of claim 1, wherein the outside surface of the central wall portion has a purchase enhancing structure.

8. The rebar structure of claim 7, wherein the purchase enhancing structure has a granular form.

9. The rebar structure of claim 1, further comprising a reinforcing core structure inside the inner wall portion.

10. The rebar structure of claim 9, wherein the reinforcing core structure includes a wagon wheel configuration.

11. The rebar structure of claim 9, wherein the reinforcing core structure includes an expandable foam.

12. The rebar structure of claim 1, wherein the continuous filament fiber mat is a non-woven array of randomly oriented glass fibers in the form of a long strip wrapped around the core axis.

13. The rebar structure of claim 1, wherein the central wall portion has a first thickness and the inner wall portion has a second thickness and wherein the first thickness is at least twice the second thickness.

14. A rebar structure for concrete reinforcement, comprising:
- an elongate tubular first wall portion having an inside surface and an outside surface, formed circumferentially around a core axis, the first wall portion including fibers comprising at least one of glass, carbon, and basalt, the fibers mostly being oriented longitudinally parallel to the core axis; and
- an elongate tubular second wall portion having an inside surface and an outside surface, the second wall portion bonded to the first wall portion, the second wall portion including a continuous filament fiber mat of glass or carbon fibers, the fiber mat having fibers which point in random directions, having at least one component around the core axis, relative to the fibers in the first wall portion.

15. The rebar structure of claim 14, wherein the second wall portion is an inner wall portion and the outside surface of the second wall portion is bonded to the inside surface of the first wall portion.

16. The rebar structure of claim 14, wherein the second wall portion is an outer wall portion and the inside surface of the second wall portion is bonded to the outside surface of the first wall portion.

17. The rebar structure of claim 14, wherein the fiber mat is a non-woven array of randomly oriented glass fibers in the form of a long strip wrapped around the core axis.

18. The rebar structure of claim 14, wherein the first wall portion has a first thickness and the second wall portion has a second thickness and wherein the first thickness is at least twice the second thickness.

19. A rebar structure for concrete reinforcement, comprising:
- an elongate tubular central wall portion having an inside surface and an outside surface, formed circumferentially around a core axis, the central wall portion including fibers comprising at least one of glass, carbon, and basalt, the fibers mostly being oriented longitudinally parallel to the core axis,
- an inner wall portion bonded to the inside surface of the central wall portion, the inner wall portion including glass or carbon fibers, the inner wall portion having a higher percentage of fibers oriented randomly and non-parallel to the core axis as compared to the central wall portion, and
- an elongate tubular outer wall portion bonded to the outside surface of the central wall portion, the outer wall portion including fibers comprising at least one of glass, carbon, and basalt, the outer wall portion having a higher percentage of fibers oriented randomly and non-parallel to the core axis as compared to the central wall portion,
- wherein an outside surface of the outer wall portion has a purchase enhancing structure including a first plurality of grooves formed in the outside surface and a second plurality of grooves formed in the outside surface, each of the grooves in the first plurality of grooves intersecting a groove in the second plurality of grooves at an angle.

20. The rebar structure of claim 19, wherein the outer wall portion includes a thermosetting resin and the purchase enhancing structure includes a three-dimensional structure of voids and material formed of the thermosetting resin.

* * * * *